(12) United States Patent
Humfeld (10) Patent No.: US 10,266,677 B2
(45) Date of Patent: Apr. 23, 2019

(54) GRAPHENE-AUGMENTED COMPOSITE MATERIALS

(71) Applicant: The Boeing Company, Chicago, IL (US)

(72) Inventor: Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 14/589,007

(22) Filed: Jan. 5, 2015

(65) Prior Publication Data
US 2016/0193751 A1    Jul. 7, 2016

(51) Int. Cl.
*C08K 9/04* (2006.01)
*C08J 5/04* (2006.01)
(Continued)

(52) U.S. Cl.
CPC .............. *C08K 9/04* (2013.01); *B29C 70/025* (2013.01); *B29C 70/10* (2013.01); *C08J 5/042* (2013.01);
(Continued)

(58) Field of Classification Search
None
See application file for complete search history.

(56) References Cited

U.S. PATENT DOCUMENTS 7,832,983 B2 * 11/2010 Kruckenberg ......... B82Y 30/00
   415/200

8,361,321 B2 * 1/2013 Stetson ................. B01D 61/02
   210/257.2
(Continued)

FOREIGN PATENT DOCUMENTS

CN      102409528 A     4/2012
CN      103015157 A     4/2013
(Continued)

OTHER PUBLICATIONS

Lin et al., Bulk preparation of holey graphene via controlled catalytic oxidation, Nanoscale, 2013, 5, pp. 7814-7824.*
(Continued)

*Primary Examiner* — Elizabeth A Robinson
(74) *Attorney, Agent, or Firm* — Ostrager Chong Flaherty & Broitman PC (57) ABSTRACT

Composite materials having carbon reinforcement fibers impregnated with a matrix material are augmented with functionalized graphene nanoplatelets having amine groups formed on a surface of the graphene nanoplatelets and epoxide groups formed on at least one edge of the graphene nanoplatelets as a supplement to or a replacement for resin matrix material to increase strength of the composite materials. Related methods of increasing strength of composite materials include mixing the functionalized graphene nanoplatelets into the matrix material prior to impregnating the carbon reinforcement fibers, depositing the functionalized graphene nanoplatelets onto the matrix material to form an interlayer, and depositing the functionalized graphene nanoplatelets onto a bed of carbon reinforcement fibers with no resin matrix material. The composite materials and related methods for increasing strength of composite materials may include graphene nanoplatelets having holes formed through the graphene nanoplatelets.

11 Claims, 11 Drawing Sheets

(51) Int. Cl.

| | | |
|---|---|---|
| *C08J 5/24* | (2006.01) | |
| *C08K 3/04* | (2006.01) | |
| *B29C 70/10* | (2006.01) | |
| *B29C 70/02* | (2006.01) | |
| *B29K 63/00* | (2006.01) | |
| *B29K 307/04* | (2006.01) | |
| *B29K 507/04* | (2006.01) | |
| *B29K 105/08* | (2006.01) | |
| *B29K 105/16* | (2006.01) | |
| *B29L 9/00* | (2006.01) | |

(52) U.S. Cl.
CPC .................. *C08J 5/24* (2013.01); *C08K 3/04* (2013.01); *C08K 3/042* (2017.05); *B29K 2063/00* (2013.01); *B29K 2105/0881* (2013.01); *B29K 2105/162* (2013.01); *B29K 2307/04* (2013.01); *B29K 2507/04* (2013.01); *B29L 2009/00* (2013.01); *C08J 2363/00* (2013.01)

(56) References Cited

U.S. PATENT DOCUMENTS

| | | | |
|---|---|---|---|
| 8,647,548 B1 | 2/2014 | Humfeld | |
| 8,715,609 B2 | 5/2014 | Humfeld et al. | |
| 2009/0124705 A1 | 5/2009 | Meyer | |
| 2011/0017587 A1 | 1/2011 | Zhamu et al. | |
| 2011/0052813 A1* | 3/2011 | Ho | B82Y 30/00 427/256 |
| 2012/0077020 A1 | 3/2012 | Muramatsu | |
| 2012/0088864 A1* | 4/2012 | Wang | C08L 63/00 523/435 |
| 2012/0298396 A1 | 11/2012 | Hong et al. | |
| 2012/0330044 A1 | 12/2012 | Hou et al. | |
| 2013/0034724 A1 | 2/2013 | Sodano | |
| 2013/0164498 A1 | 6/2013 | Langone | |
| 2014/0050920 A1 | 2/2014 | Ray | |
| 2014/0121350 A1 | 5/2014 | You et al. | |
| 2014/0308517 A1 | 10/2014 | Zhamu et al. | |
| 2015/0004667 A1* | 1/2015 | McKinney | C07K 17/14 435/188 |
| 2015/0079340 A1* | 3/2015 | Bullock | B32B 3/20 428/138 |

FOREIGN PATENT DOCUMENTS

| | | |
|---|---|---|
| CN | 103614902 A | 3/2014 |
| CN | 103396586 B | 11/2014 |
| JP | 2008248457 A | 10/2008 |
| KR | 101436500 B1 | 10/2014 |
| WO | 2007130979 A2 | 11/2007 |
| WO | 2012058553 A2 | 5/2012 |
| WO | 2012094634 A2 | 7/2012 |
| WO | 2012094634 A3 | 7/2012 |
| WO | 2013191809 A1 | 12/2013 |
| WO | 2014172619 A1 | 10/2014 |

OTHER PUBLICATIONS

Kuila et al., Chemical functionalization of graphene and its applications, Mar. 30, 2012, Progress in Materials Science 57 (2012) pp. 1061-1105 (Year: 2012).*
U.S.P.T.O. Office Action in co-pending U.S. Appl. No. 14/589,057 dated Nov. 20, 2015.
Matei, Dan G. et al., "Functional Single-Layer Graphene Sheets from Aromatic Monolayers," Advanced Materials, 2013, 25, 4146-4151, Wiley-VCH Verlag GmbH & Co. KGaA, Weinhein, Germany.
European Search Report in related application No. EP 15188441.8, dated May 20, 2016, of the Boeing Company.
Database WPI, Week 201433, Thomson Scientific, London, GB; AN 2014-H03644, XP002757211, Shanghai Inst. Technology, Mar. 5, 2014.
Database WPI, Week 201474, Thomson Scientific, London, GB; AN 2014-U10828, XP002757154, Korea Inst. Machinery & Materials, Oct. 17, 2014.
Database WPI, Week 201251, Thomson Scientific, London, GB; AN 2012-E63084, XP002757212, Harbin Inst. Technology, Apr. 11, 2012.
Database WPI, Week 201370, Thomson Scientific, London, GB; AN 2013-P18120, XP002757215, Univ. Tianjin Polytechnic, Apr. 3, 2013.
Database WPI, Week 200876, Thomson Scientific, London, GB; AN 2008-M91181, XP002757213, Mitsui Bussan KK, Oct. 16, 2008.
European Search Report in related application No. EP 15188443.4, dated May 13, 2016, of the Boeing Company.
Federico, Bosia et al., "In Silico Tensile Tests and Design of Hierarchical Graphene Fibres and Composites," Physica Status Solidi. B, Basic Research, vol. 250, No. 8, Jul. 24, 2013, pp. 1492-1495.
USPTO Office Action dated Jun. 23, 2016 in related U.S. Appl. No. 14/865,820.
European Search Report in corresponding application No. EP 15188442.6, dated Apr. 6, 2016.
Office Action dated Aug. 24, 2017 in U.S. Appl. No. 14/589,036.
USPTO Office Action dated Jan. 23, 2019 in U.S. Appl. No. 14/589,036 naming the same inventor.
Eaton et al., "Nano-reinforcement of Resin Infused Carbon Fibre Laminates using Carbon Nano-tubes and Graphene", 3 pages, published at least as early as Jul. 2014.†
Fang et al., "Constructing hierarchically structured interphases for strong and tough epoxy nanocomposites by amino-rich graphene surfacast", pp. 9635-9643, published at least as early as Nov. 2010, Journal of Materials Chemistry.†
Hahn et al., "Graphite Nanoplatelet Composites and Their Applications", Chapter 7 of "Composite Materials: A Vision for the Future", pp. 169-186, published at least as early as May 2011, Springer.†

* cited by examiner
† cited by third party

GRAPHENE-AUGMENTED COMPOSITE MATERIALS

TECHNICAL FIELD

This disclosure generally relates to composite materials augmented with graphene, composite structures including component parts made from graphene-augmented composite materials, and methods for manufacturing graphene-augmented composite materials and composite structures with component parts made from graphene-augmented composite materials.

BACKGROUND

Composite materials are used in the manufacture of a wide variety of structures and component parts due to their high strength and rigidity, low weight, corrosion resistance and other favorable properties. For example, in the aerospace industry, composite materials are becoming widely used to manufacture aerospace structures and component parts for aerospace structures such as aircraft ribs, spars, panels, fuselages, wings, wing boxes, fuel tanks, tail assemblies and other component parts of an aircraft because they are lightweight and strong, and therefore provide fuel economy and other benefits.

One type of composite material commonly used in the aerospace industry is carbon fiber reinforced plastic ("CFRP"). CFRP generally comprises one or more composite layers or plies laminated together to form a sheet, laminate or layup. Each of the composite layers or plies comprises a reinforcement material and a matrix material. The matrix material surrounds, binds and supports the reinforcement material, and is generally a non-conductive polymer such as an epoxy resin. For aerospace applications, an aerospace grade resin is used, typically having four (4) epoxide groups in each epoxy monomer molecule to form multiple connections. The reinforcement material provides structural strength to the matrix material and the CFRP, and generally consists of strands of carbon fiber, which are electrically conductive. As used herein, the term "composite structure" means a structure that is manufactured, fabricated or assembled, in whole or in part, from one or more component parts made from composite materials (i.e., composite components) including, without limitation, aerospace structures.

It is desirable to increase the amount of carbon in CFRP to further improve mechanical and/or electrical properties of composite structures without increasing weight or disturbing other desirable properties. But, simply increasing the amount of carbon fiber reinforcement material in CFRP does not meet this goal and is not cost efficient. Other forms of carbon, such as graphene, which has exceptional mechanical strength and thermal conductivity, would have beneficial effects in composite structures. Graphene is a hexagonal array of carbon atoms extending over two dimensions (i.e., it is one atom thick) that is typically produced in small flakes (or nanoplatelets). Each carbon atom in graphene is covalently bonded to three other carbon atoms, providing exceptional strength. However, mixing graphene into an epoxy resin comprising carbon fibers makes the epoxy resin weaker to rain in every direction because graphene will not bond with the carbon fibers and does not interact much with the epoxy resin.

Accordingly, there is room for improving the mechanical and electrical properties of composite structures and related methods for manufacturing composite structures that provide advantages over known composite structures and manufacturing methods.

SUMMARY

The foregoing purposes, as well as others, are achieved by integrating functionalized graphene, with amine groups formed on the surface of the graphene, epoxide groups formed on at least one edge of the graphene and/or holes formed through the graphene, into CFRP composite materials as a supplement to or as a replacement for resin matrix material. The amine groups in the functionalized graphene form strong bonds with epoxide groups in the resin matrix material and the epoxide groups in the functionalized graphene form strong bonds with amine groups in the resin matrix material, therefore overcoming prior difficulties of compositing graphene with aerospace-grade and other resins. Holes may be provided through the graphene to provide additional edges where epoxide groups can form and bond to amine groups in the resin matrix material.

In accordance with a product of the disclosure, a composite material comprises carbon fiber reinforcement material and a matrix material comprising 0.1% to 100% by weight functionalized graphene nanoplatelets having amine groups formed on a surface of the graphene nanoplatelets and epoxide groups formed on at least one edge of the graphene nanoplatelets. The amine groups have a surface density of about 4.0E10 to about 2.0E12 groups per square millimeter or about 0.1% to about 5.0% of the carbon atoms in the graphene nanoplatelets have amine groups bonded thereto. The epoxide groups have a linear density at the edge of the graphene nanoplatelets of about 7,000 to about 700,000 groups per millimeter or about 0.1% to about 10% of carbon atoms at the edge of the graphene nanoplatelets have epoxide groups bonded thereto. Optionally, holes having a size of about 12-80 carbon atoms or a diameter of about 1-2 nanometers may be formed through the graphene nanoplatelets.

In one embodiment of the composite material, the functionalized graphene nanoplatelets are mixed into an aerospace-grade epoxy resin matrix material such that the matrix material has 0.1% to 5.0% by weight functionalized graphene nanoplatelets, and the graphene nanoplatelets are present throughout the epoxy resin matrix material. The epoxy resin is a macromolecular complex.

In another embodiment of the composite material, the functionalized graphene nanoplatelets are formed as an interlayer between a first composite layer comprising carbon fiber reinforcement material impregnated in an aerospace-grade epoxy resin matrix material and a second composite layer of aerospace-grade epoxy resin matrix material with no carbon fiber reinforcement material. The interlayer is a macromolecular complex of the epoxy resin.

In a further embodiment of the composite material, the matrix material comprises 100% by weight functionalized graphene nanoplatelets. There is no resin in the matrix material. The composite material comprises only carbon fiber reinforcement material and functionalized graphene nanoplatelets. The matrix material in this embodiment is a macromolecular complex of graphene nanoplatelets.

In accordance with a method of the disclosure, a method of increasing strength, stiffness and modulus of a composite material comprising carbon reinforcement fibers and a resin matrix material is provided. In a first embodiment, functionalized graphene nanoplatelets having amine groups formed on a surface of the graphene nanoplatelets and epoxide groups formed on at least one edge of the graphene nanoplatelets are mixed into a resin matrix material to form a graphene-resin mixture. The graphene-resin mixture is combined with a plurality of carbon reinforcement fibers to form a prepreg material, and the prepreg material is cured to form the composite material with increased strength, stiffness and modulus.

In another embodiment of the method, a resin matrix material is combined with a plurality of the carbon reinforcement fibers to form a prepreg material. Functionalized graphene nanoplatelets having amine groups formed on a surface of the graphene nanoplatelets and epoxide groups formed on at least one edge of the graphene nanoplatelets are deposited onto a top surface of the prepreg material to form a graphene interlayer. A second layer of the resin matrix material may be laid up on top of the graphene interlayer, and the prepreg material, the graphene interlayer and the second layer of resin matrix material may be cured to form the composite material.

In a further embodiment of the method, a bed of carbon reinforcement fibers is formed, and functionalized graphene nanoplatelets having amine groups formed on a surface of the graphene nanoplatelets and epoxide groups formed on at least one edge of the graphene nanoplatelets are deposited through a top surface of the bed of the carbon reinforcement fibers and penetrate the entire bed of fibers to form a carbon fiber/graphene prepreg material. The carbon fiber/graphene prepreg material is then cured to form the composite material.

Composite structures, including aerospace structures, comprising component parts made with composite materials having the disclosed functionalized graphene nanoplatelets, aircraft comprising such composite structures, and methods for making such composite structures are also considered to be within the scope of the present disclosure. Other objects, features, and advantages of the various embodiments in the present disclosure will be explained in the following detailed description with reference to the appended drawings.

DETAILED DESCRIPTION

In the following detailed description, various embodiments of composite materials are described with reference to aerospace structures to illustrate the general principles in the present disclosure. It will be recognized by one skilled in the art that the present disclosure may be practiced in other analogous applications or environments and/or with other analogous or equivalent variations of the illustrative embodiments. For example, the composite materials may be used in any industry that seeks the benefits of strong and light-weight materials. One of ordinary skill in the art will recognize and appreciate that the composite materials and related methods of increasing strength, stiffness and modulus in composite materials of the disclosure can be used in any number of applications involving such vehicles and structures. It should also be noted that those methods, procedures, components, or functions which are commonly known to persons of ordinary skill in the field of the disclosure are not described in detail herein.

Figure 1:
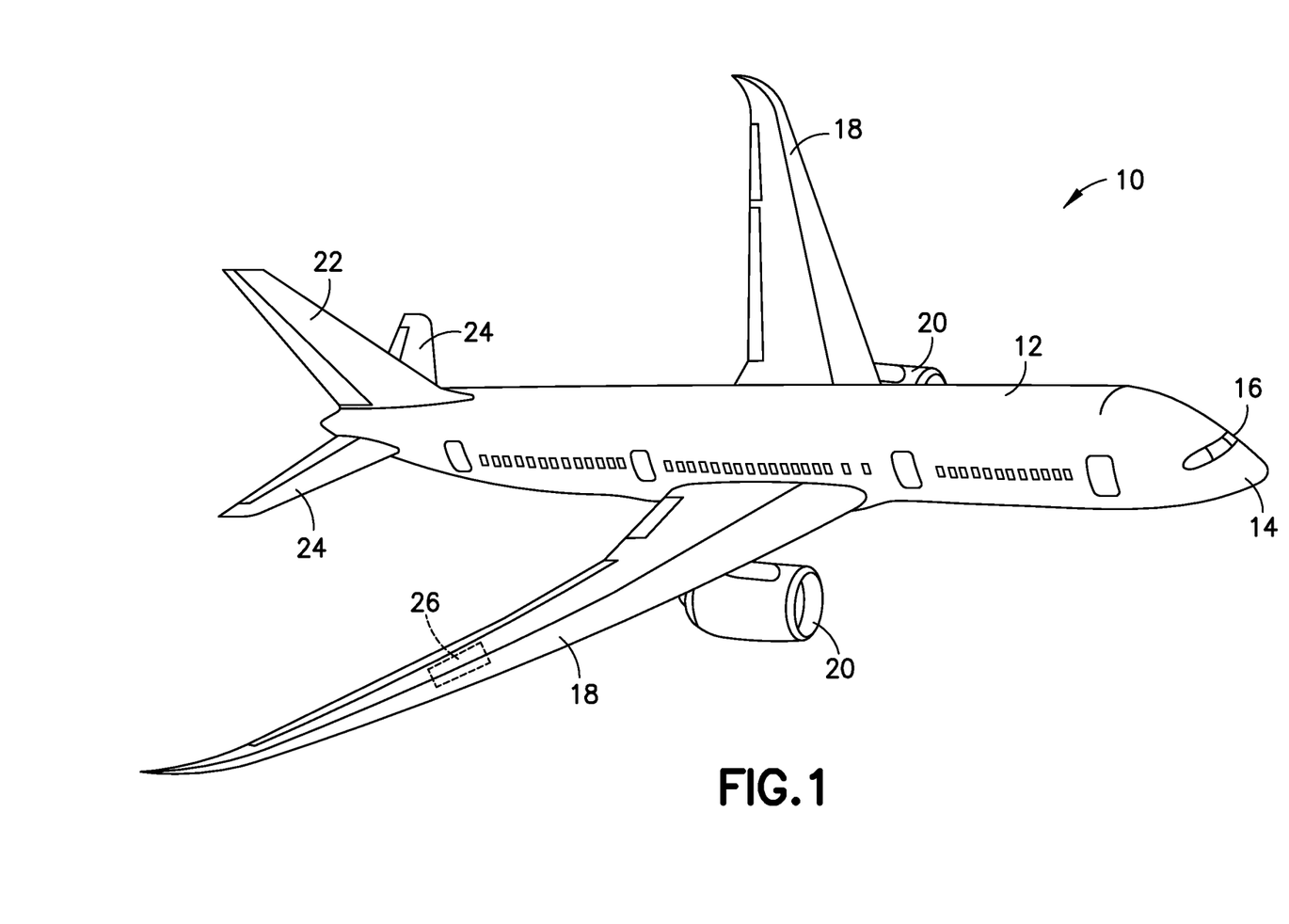
FIG. 1 is an illustration of a perspective view of an aircraft that may incorporate the composite materials disclosed herein.

Referring more particularly to the drawings, FIG. 1 is an illustration of a perspective view of an exemplary aircraft 10 that may incorporate a composite structure 26 comprising a composite material augmented with functionalized graphene nanoplatelets in accordance with this disclosure. As shown in FIG. 1, the aircraft 10 comprises a fuselage 12, a nose 14, a cockpit 16, wings 18, one or more propulsion units 20, a vertical tail portion 22, and horizontal tail portions 24. Although the aircraft 10 shown in FIG. 1 is generally representative of a commercial passenger aircraft having one or more composite structures 26, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable vehicles or items having composite structures.

Figure 2:
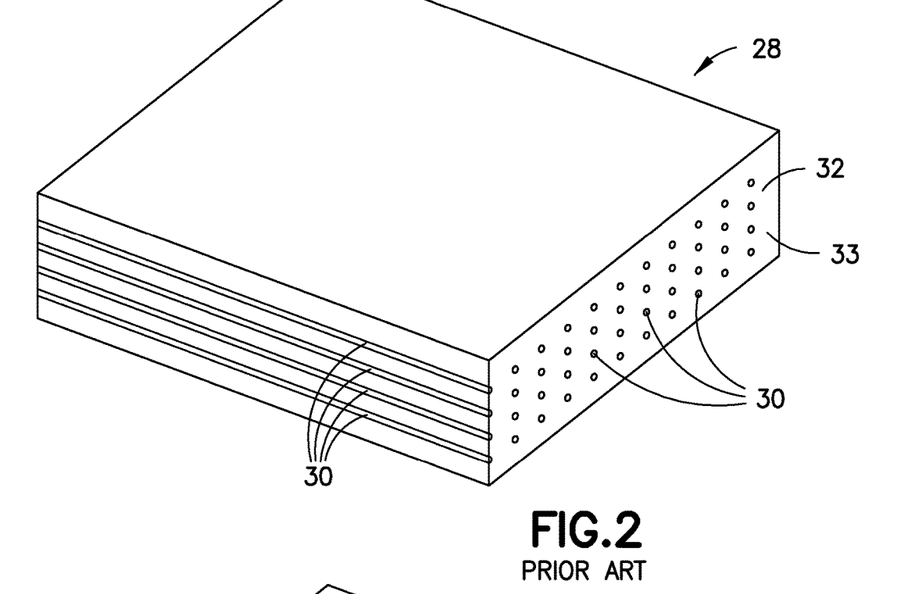
FIG. 2 is an illustration of a typical composite material comprising carbon reinforcement fibers and a matrix material.

The composite structures 26 may be any type of structure that is manufactured, fabricated or assembled, in whole or in part, from one or more component parts made from composite materials. An exemplary illustration of a typical CFRP-type of composite material 28 is shown in FIG. 2 comprising a single layer of carbon reinforcement fibers 30 impregnated with a matrix material 32. The matrix material 32 surrounds, binds and supports the carbon reinforcement fibers 30 and is generally a non-conductive polymer such as an epoxy resin 33. For aerospace applications, an aerospace-grade resin is used as the matrix material 32, having four (4) epoxide groups in each epoxy monomer molecule to form multiple connections. Typically, the molecules are tri- or tetra-functional epoxies and bifunctional amines. Since one component is at least tri-functional, the result of the extensive epoxy-amine chemical reaction is a dendrimeric structure, which provides strength and toughness greater than non-aerospace grade bi-functional epoxy resins. Aerospace-grade resins suitable for the composite materials of this disclosure should include epoxy-amine resin systems having a cure temperature in the range of about 250° F. to 355° F. Examples of such resins include, but are not limited to, a toughened epoxy resin 3900-2 available from Toray Resin Company, a division of Toray Industries, Inc., Troy, Mich., and the CYCOM® 977-3 and CYCOM® 5320-1 curing resins available from Cytec Industries Inc., West Paterson, N.J.

In view of its exceptional properties, graphene has attracted tremendous research interest in recent. years, particularly in the field of electronics. Graphene can now be made flawlessly or with controlled flaws in a molecular monolayer of unlimited length and width (i.e., it may be scaled for roll-to-roll processing), with grain size on the order of 100 nanometers. The controlled flaws can include amino-terminated groups (or amine groups) or other chemical functionalization with controlled density. Graphene may also be formed with holes having a predetermined size and location. In addition, graphene can now be oxidized by weak acids in whole or in part to form graphene derivatives, such as graphene oxide (GO) and reduced graphene oxide (rGO), haying epoxide groups throughout the graphene, on part of the graphene, or only at its edges.

Figure 3:
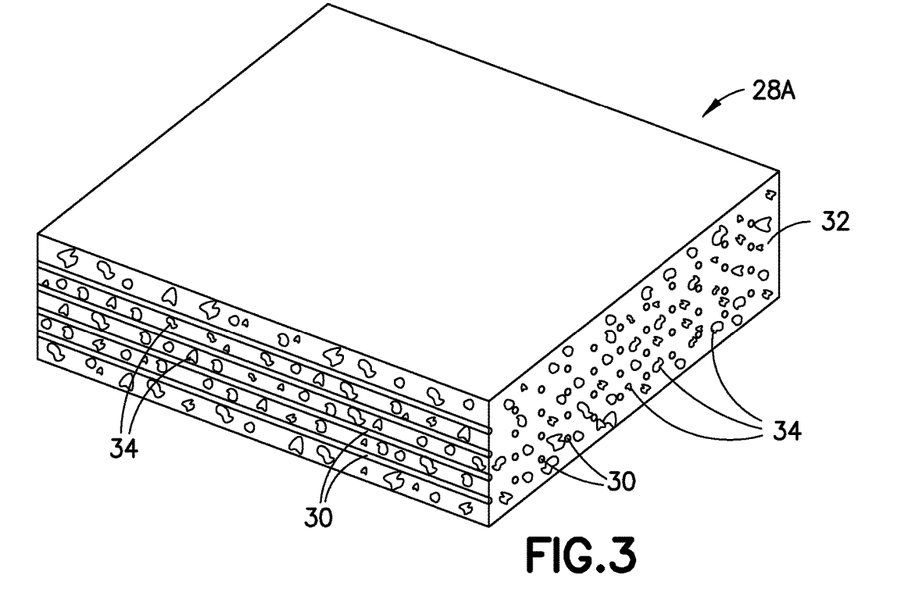
FIG. 3 is an illustration of one embodiment of an improved composite material in accordance with this disclosure.
Figure 4:
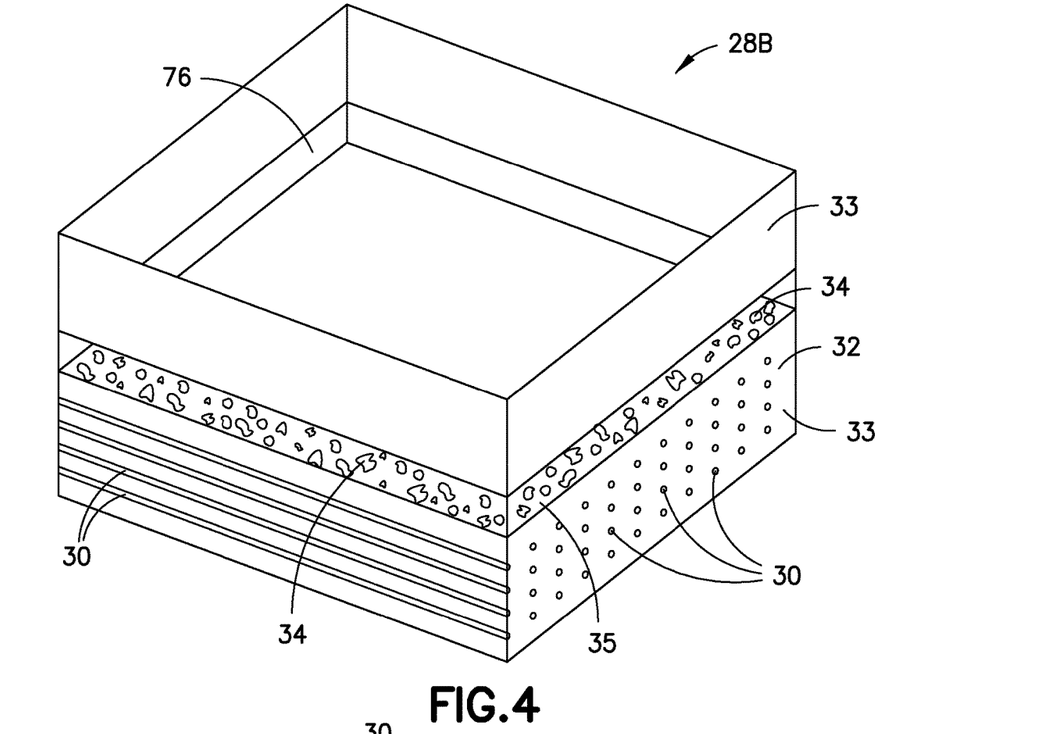
FIG. 4 is an illustration of another embodiment of an improved composite material in accordance with this disclosure.
Figure 5:
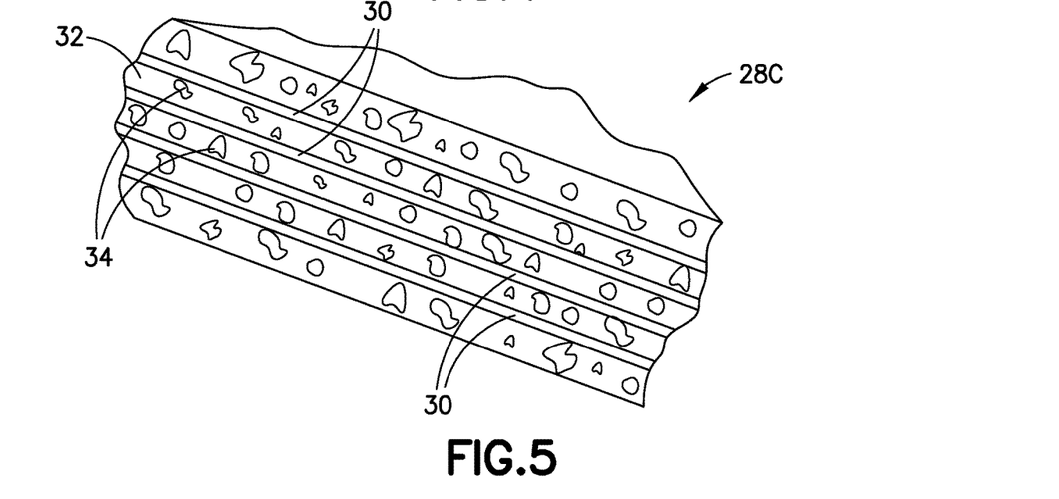
FIG. 5 is an illustration of yet another embodiment of an improved composite material in accordance with this disclosure.

It has been determined that integrating functionalized graphene nanoplatelets (GNP), with amine groups formed on the surface of the GNP, epoxide groups formed on at least one edge of the GNP and/or holes formed through the GNP, into CFRP-type composite materials 28 (like the one shown in FIG. 2) as a supplement to or as a replacement for the resin 33 in the matrix material 32 provides substantial benefits to the strength, stiffness and modulus of the composite materials 28, whereas the compositing of non-functionalized GNP includes no chemical interactions between any resin 33 in the matrix material 32 and the non-functionalized GNP, resulting in slip plane formation and decreased strength, stiffness and modulus in aerospace-grade resin matrix materials 32. FIGS. 3-5 illustrate three exemplary embodiments of improved composite materials 28A, 28B, 28C, respectively, wherein the matrix material 32 comprises from about 0.1% to 100% by weight functionalized GNP 34. At 100 weight %, the matrix material 32 comprises no resin 33; only functionalized GNP 34, as shown in FIG. 5.

Figure 6:
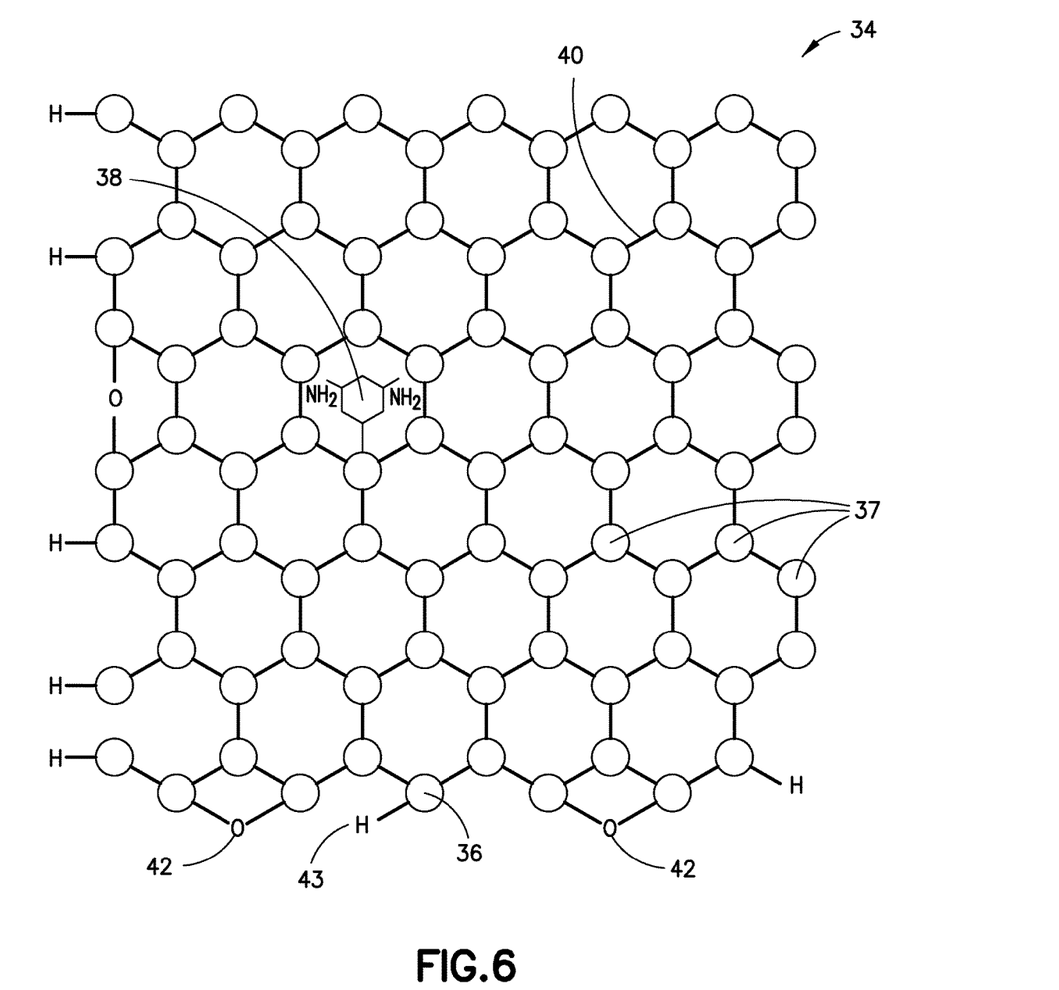
FIG. 6 is an illustration of one embodiment of a functionalized graphene nanoplatelet that may be used in the improved composite materials of this disclosure.

The functionalized GNP 34 has a generally rectangular shape with edges 36 having a length on the order of 10-5,000 nanometers (0.01-5 microns). FIG. 6 is an illustration of a functionalized GNP 34 having added amine groups 38 on the surface 40 of the functionalized GNP 34, and added epoxide groups 42 on at least one of the edges 36 of the functionalized GNP 34.

The amine groups 38 on the surface 40 of the functionalized GNP 34 have a surface density of about 4.0E10 to about 2.0E12 groups per square millimeter (about 4.0E4 to about 2.0E6 groups per square micrometer or about 0.4 to about 2.0 groups per square nanometer). The surface density of amine groups 38 may also be described as about 0.1% to about 5.0% of carbon atoms 37 in the functionalized GNP 34 have amine groups 38 bonded thereto. That is, 1 to 50 carbon atoms 37 per 1,000 carbon atoms have an amine group 38 bonded thereto.

GNP may be functionalized with amine groups 38 on the surface 40 by several methods including, for example, the methods disclosed in U.S. Publication No. 2014/0121350 A1 to YOU et al., published May 1, 2014, for preparing a polyimide-graphene composite material, and the method disclosed in Matei, Dan G. et al., "Functional Single-Layer Graphene Sheets from Aromatic Monolayers," *Advanced Materials*, 2013, 25, 4146-4151, WILEY-VCH Verlag GmbH & Co., Weinheim, Germany. In one method of graphene production, polycyclic aromatic hydrocarbon (PAH) molecules adsorb to a surface and the interactions of their aromatic rings cause them to form a self-assembled monolayer (SAM). The remainder of each molecule beyond its first aromatic ring sticks up from the SAM. By including a second species of PAH with an amine group at some low concentration relative to the first PAH species, a SAM with amine groups can be formed. For example, one out of every 100 aromatic molecules may have an extra amine group sticking up out of it. Electron irradiation is used to induce bonds between the aromatic molecules at the surface to form a carbon nanomembrane (CNM). Temperature induced annealing in a vacuum or under protective atmosphere will complete the conversion of CNM into graphene. Other methods of adding amine groups 38 may be used, and any type of amine structure may be added including, for example, 4, 4' diamino diphenyl sulfone; 1-(4-aminophenyl)-1,3,3-trimethylindan-5-amine; N,N-bis(4-aminophenyl)benzene-1,4-diamine; 4,4'-methylenedianiline; 4,4'-oxydianiline; 3,3'-[1,3-phenylenebis(oxy)]dianiline; 4,4'-(9H-fluorene-9,9-diyl)dianiline; 4,4'-[1,3-phenylenebis(oxy)]dianiline; 4,4'-methylenebis(2-ethylaniline); 3,3'-[(2, 2-dimethylpropane-1,3-diyl)bis(oxy)]dianiline; 3,3'-[1,4-phenylenebis(methylene)]dianiline; 4,4'-sulfonylbis(N-methylaniline); 4,4'-[1,4-phenylenebis(oxy)]dianiline; 3,3'-sulfonyldianiline; aniline; 4,4'-(phenylphosphoryl)dianiline; 3-aminophenol; 4,4'-methylenedicyclohexanamine; 4,6-diethyl-2-methylbenzene-1,3-diamine; 2-(aminomethyl)-2,5, 5-trimethylcyclohexanamine; 4,4'-thiodianiline; 2,2'-dimethylbiphenyl-4,4'-diamine; N-isopropyl-N'-phenylbenzene-1,4-diamine; N-(1,3-dimethylbutyl)-N'-phenylbenzene-1,4-diamine (Phenyl DMB); and N-cyclohexyl-N'-phenylbenzene-1,4-diamine (Phenyl CH).

The functionalized GNP 34 has a linear density of epoxide groups 42 formed on the at least one of the edges 36 of the functionalized GNP 34 of about 7,000 to about 700,000 groups per millimeter (or about 0.007 to about 0.7 groups per nanometer, or about 7 to about 700 per micrometer). The density of epoxide groups 42 may also be represented as about 0.1% to about 10% of carbon atoms at the edges 36 of the functionalized GNP 34 have epoxide groups 42 bonded thereto. That is, 1 to 100 carbon atoms 37 per 1,000 carbon atoms 37 has an epoxide group 42 bonded thereto.

GNP may be functionalized with additional epoxide groups 42 by oxidation. Graphene can be oxidized by weak acids in whole or in part to form graphene derivatives, such as graphene oxide (GO) and reduced graphene oxide (rGO), having epoxide groups 42 throughout the graphene derivative, on part of the graphene derivative, or only at its edges 36. The weak acid would first attack the edges 36 of the GNP 34 where there are hydrogen terminations 43, The amount of oxidation is determined by the acid strength and exposure time. Examples of weak acids include formic acid, acetic acid and hydrogen sulfide. It is noted that "weak" does not mean that acid has a high pH. Instead, an acid is described as weak if it is only partially ionized in solution. Exposing the amine-functionalized graphene to a solution of formic acid for up to 30 minutes and then cleaning with ethanol may provide the desired density of epoxide groups 42. Other methods of adding epoxide groups 42 may be used, and any type of epoxide structures may be added including, for example, 2,2'-[propane-2,2-diylbis(4,1-phenyleneoxymethylene)]dioxirane; 2,2'-[methylenebis(4,1-phenyleneoxymethylene)]dioxirane; 2,2'-[methylenebis(2,1-phenyleneoxymethylene)]dioxirane; 2,2'-[ethane-1,1-diylbis(4,1-phenyleneoxymethylene)]dioxirane; (Bis M); 4-(oxiran-2-ylmethoxy)-N,N-bis(oxiran-2-aniline; 2,2'-[thiobis(4,1-phenyleneoxymethylene)]dioxirane; 2,2'-[sulfonylbis(4,1-phenyleneoxymethylene)]dioxirane; 2,2'-[butane-1,4-diylbis(oxymethylene)]dioxirane; 3-(oxiran-2-ylmethoxy)-N,N-bis(oxiran-2-ylmethyl)aniline; 2,2'-oxybis (6-oxabicyclo [3.1.0]hexane); 2,2'-[1,4-phenylenebis(oxymethylene)]dioxirane; 2,2'-[prop-1-ene-1,2-diylbis(4,1-phenyleneoxymethylene)]dioxirane; 2,2'-[1,3-phenylenebis (oxymethylene)]dioxirane; 2,2'-[cyclohexane-1,2-diylbis (oxymethylene)]dioxirane; 2,2'-[(2,2-dichloroethene-1,1-diyl)bis(4,1-phenyleneoxymethylene)]dioxirane; 2,2'-[cyclohexane-1,4-diylbis(methyleneoxymethylene)] dioxirane; (Bis I); (Bis AF); (Bis Z); (Bis C); (Bis TMC); (Bis P); 2,2'-{propane-2,2-diylbis[(2,6-dibromo-4,1-phenylene)oxymethylene]}dioxirane; 7-oxabicyclo[4.1.0]hept-3-ylmethyl 7-oxabicyclo[4.1.0]heptane-3-carboxylate.

Figure 7:
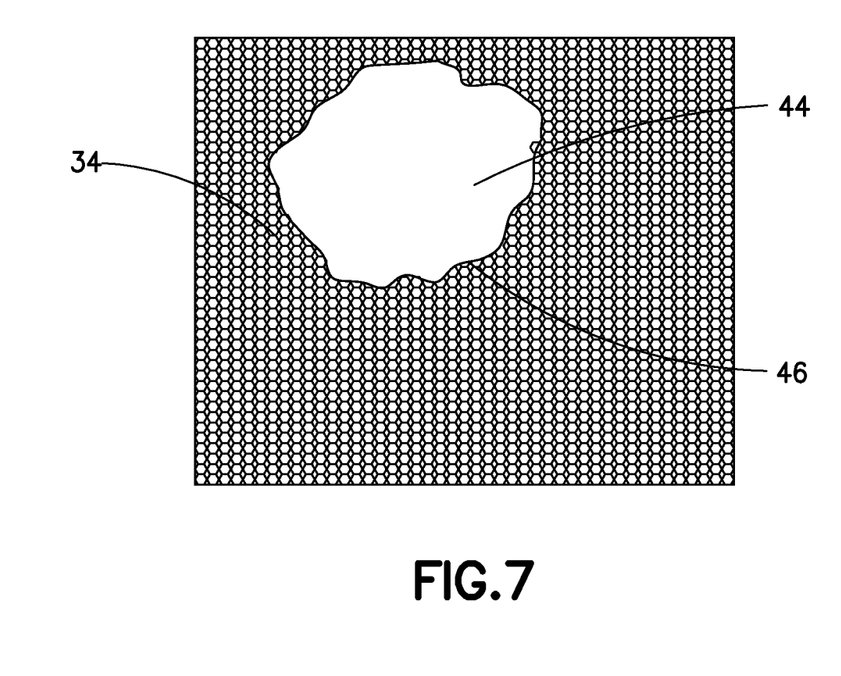
FIG. 7 is an illustration of another embodiment of a functionalized graphene nanoplatelet that may be used in the improved composite materials of this disclosure.

Optionally, as shown in FIG. 7, functionalized GNP 34 may be further functionalized by adding at least one hole 44 through the functionalized GNP 34 to provide additional edges 46 where epoxide groups 42 can form. The at least one hole 44 may be formed by providing energy (such as with a laser) to remove molecules from the SAM prior to formation of the CNM. Preferably, the at least one hole 44 is formed in the functionalized GNP 34 to have a substantially circular shape with a diameter of about 1-2 nanometers and a size of about 12-80 carbon atoms 37. That is, about 12-80 carbon atoms 37 are removed from the functionalized GNP 34 to form the at least one hole 44 in the functionalized GNP 34. Preferably, each functionalized GNP 34 comprises at least two holes 44. The holes 44 in the functionalized GNP 34 provide space for molecules in, for example, a matrix material 32 to penetrate the holes 44 and be mechanically constrained by the functionalized GNP 34, thereby further improving bonding capabilities.

Figure 8:
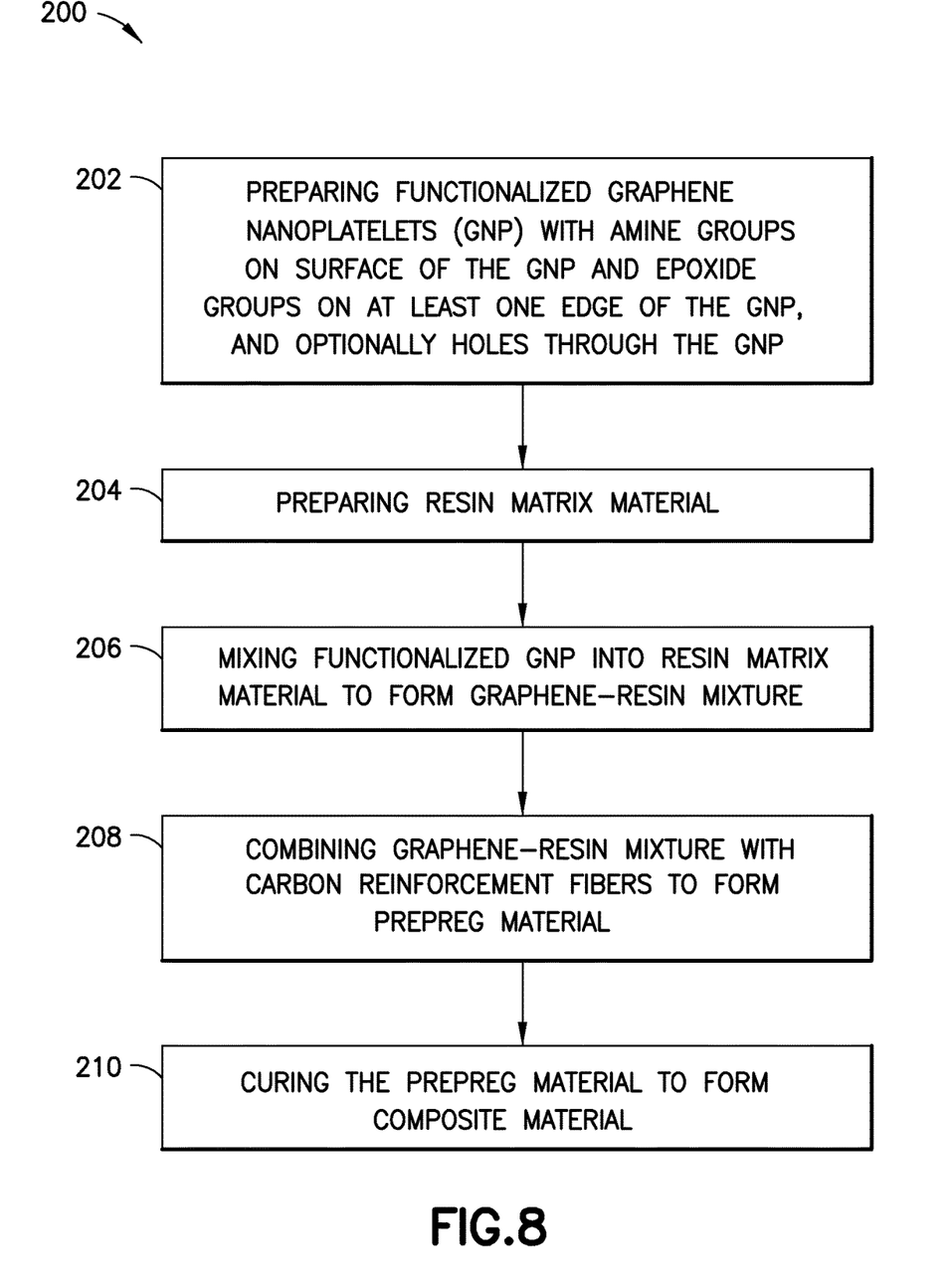
FIG. 8 is an illustration of a flow diagram of an exemplary method for increasing the strength, modulus and stiffness of a composite material.

FIG. 8 is an illustration of a flow diagram of an exemplary embodiment of a method 200 of increasing strength, modulus and stiffness of the composite material 28 shown in FIG. 2 comprising carbon reinforcement fibers 30 and a matrix material 32 comprising epoxy resin 33. The method 200 comprises step 202 of preparing functionalized GNP 34 (see FIG. 6) having amine groups 38 formed on a surface 40 of the functionalized GNP 34 and epoxide groups 42 formed on at least one of the edges 36 of the functionalized GNP 34 in accordance with the disclosure above. The functionalized GNP 34 should be roughly rectangular in shape with edges 36 having a length on the order of about 100-5,000 nanometers (0.1-5 microns). Optionally, the functionalized GNP 34 may be provided with holes 44 formed through the functionalized GNP 34 as disclosed above.

In step 204, a matrix material 32 is prepared to be an aerospace-grade resin 33. The matrix material 32 may be prepared having the qualities of an aerospace-grade resin, or purchased from a supplier of aerospace-grade resins.

Step 206 of the method 200 comprises mixing the functionalized GNP 34 into the matrix material 32 to form a graphene-resin mixture 50 using equipment and processes known in the art for mixing resins. For example, a mixer having hinge stirrers, paw type stirrers or twisted stirrers, or other types of stirrers may be used. The temperature of the matrix material 32, the speed of the stirrer and the mixing time depend on the type of equipment used, the type of resin 33, and the density of amine- and epoxide-functionalization of the functionalized GNP 34. The functionalized GNP 34 may be added to the matrix material 32 either during preparation of the matrix material 32 or after the matrix material 32 is prepared to a volume density of about 0.1% to 5.0% of the graphene-resin mixture 50. The epoxy-amine stoichiometry may be modified as appropriate given the addition of the amine groups 38 and epoxide groups 42 on the functionalized GNP 34. The goal is for the graphene-resin mixture 50 to have the same ratio of epoxide groups to amine groups as the ratio of epoxide groups to amine groups in the matrix material 32.

Optionally, extreme shear may be provided to the matrix material 32 using any commercially-available high shear mixer to cause the functionalized GNP 34 to initially flatten and to advance the matrix material 34 to a cure state of approximately 0.1 to lock in the flat functionalized GNP 34 state. Cure state is measured from 0 to 1; 1 being a 100% degree of cure. There are multiple ways to determine the current cure state of a resin. For example, the amount of energy released when a single epoxide group reacts with an amine group is known, and the number of groups per unit mass of a given resin is known. A sample of resin can be put into a Digital Scanning Calorimeter (DSC) to determine the amount of energy released by the sample over an interval of time (and simultaneously control the temperature). The determined amount of energy released can be divided by the energy per reaction to determine the number of reactions that have occurred, and then divided by the number of groups, or number of possible reactions, in the sample mass to determine the cure state of the resin. Another way to determine cure state is to place a sample of resin into a DSC, raise the temperature and wait; that would reveal the amount of energy that was released by advancing the resin to a 100% (1.0) degree of cure, which can then be used to determine what the resin's cure state had been. Alternatively, the resin's viscosity or modulus can be tested at some specific temperature. Both of these properties are known to vary with the cure state of the resin. Therefore, the viscosity or modulus as a function of the cure state and temperature can be used to determine the cure state. The glass transition temperature also varies with cure state and leaves a signal on certain types of DSC runs, so it can be detectable and used to infer the cure state.

The method 200 (FIG. 8) further comprises the step 208 of combining the graphene-resin mixture 50 with a plurality of carbon reinforcement fibers 30 to form a composite prepreg material 52. Preferably, the plurality of carbon reinforcement fibers 30 are pre-impregnated with the uncured graphene-resin mixture 50 using equipment and processes known in the art for making prepreg materials. The reinforcement fibers 30 preferably comprise carbon fibers, carbon-based fibers such as graphite fibers, aramid fibers, fiberglass fibers, glass fibers, KEVLAR® fibers (KEVLAR is a registered trademark of E.I. Du Pont De Nemours and Company Corporation of Wilmington, Del.), a combination thereof, or other suitable carbon or non-carbon fibers. The composite prepreg material 52 may comprise the reinforcement fibers 30 in unidirectional (aligned) or fabric (woven) form, impregnated to a desired amount with the graphene-resin mixture 50. The graphene-resin mixture 50 preferably transfers stresses between the reinforcement fibers 30 and thus protects the reinforcement fibers 30 from mechanical and/or environmental stresses.

Figure 9:
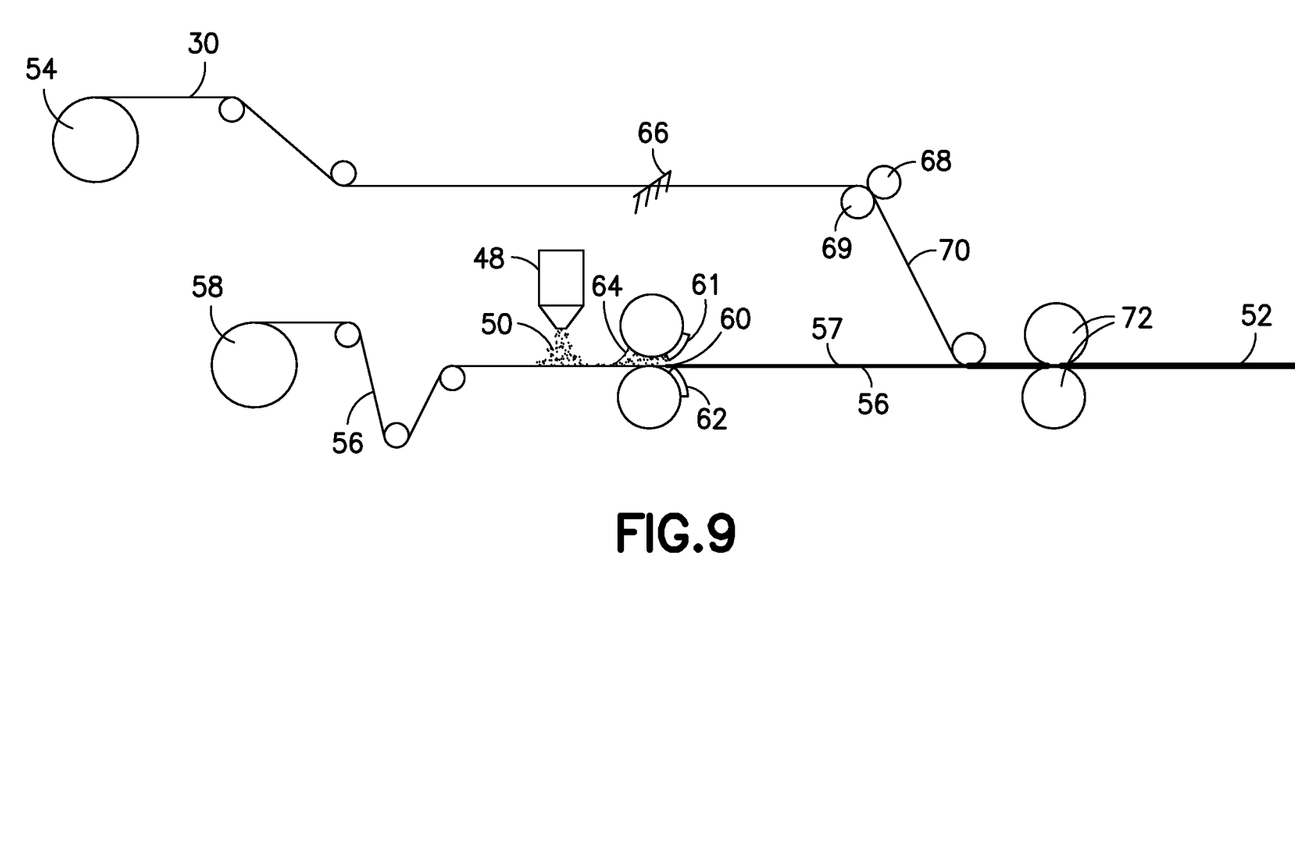
FIG. 9 is an illustration of an exemplary manufacturing process line that may be used in the method shown in FIG. 8.

An exemplary illustration of equipment that may be used in step 208 to form the composite prepreg material 52 is shown in FIG. 9. A backing paper 56 is fed from a backing paper roll 58. The graphene-resin mixture 50 is deposited onto the backing paper 56 by any known type of resin application device 48 such as a fluid dispenser. The backing paper 56 and graphene-resin mixture 50 is fed through a nip 60 between a spreader bar 61 and a backing bar 62 to form a graphene-resin film 57. The height of the nip 60 between the spreader bar 61 and the backing bar 62 determines the thickness of the graphene-resin film 57. The graphene-resin mixture 50 forms a meniscus 64 behind the spreader bar 61 because there is too much graphene-resin mixture 50 to be squeezed through the nip 60. One or more creels 54 of carbon fiber 30 are fed through a spreading comb 66 and through a second set of a spreader 68 and a backing bar 69 to produce a bed 70 of aligned carbon fibers on top of the graphene-resin film 57. The bed 70 of aligned carbon fibers 30 and the backing paper 56 with graphene-resin film 57 are fed toward a pair of nip rollers 72. The nip rollers 72 are heated to decrease the resin viscosity and apply a pressure such that the graphene-resin film 57 penetrates the bed 70 of aligned carbon fibers 30 to produce a composite prepreg material 52.

In step 210 of the method 200, the composite prepreg material 52 is cured with heat and/or pressure sufficient to form the composite material 28A (shown in FIG. 3) using equipment and processes known in the art. Alternatively, the composite prepreg material 52 may be formed into various shapes to form component parts for composite structures, and then cured.

In the resulting composite material 28A, the amine groups 38 in the functionalized GNP 34 form strong bonds with epoxide groups 42 in the resin 33 of the matrix material 32, and epoxide groups 42 in the functionalized GNP 34 form strong bonds with amine groups in the resin 33 of the matrix material 32. This method results in a nanocomposite wherein the resin 33 of the matrix material 32 is a macromolecule comprised of a base amine monomer (such as 44'DDS), base epoxy monomer (such as Bisphenyl F), and the functionalized GNP 34. The dendrimeric structure of the macromolecule has been replaced with a more complicated structure that may contain loops interpenetrating other similar macromolecules, and when there are holes 44 in the functionalized GNP 34, the complicated structure may contain linkages that penetrate the holes 44, either within the same macromolecule or in other similar macromolecules.

Figure 10:
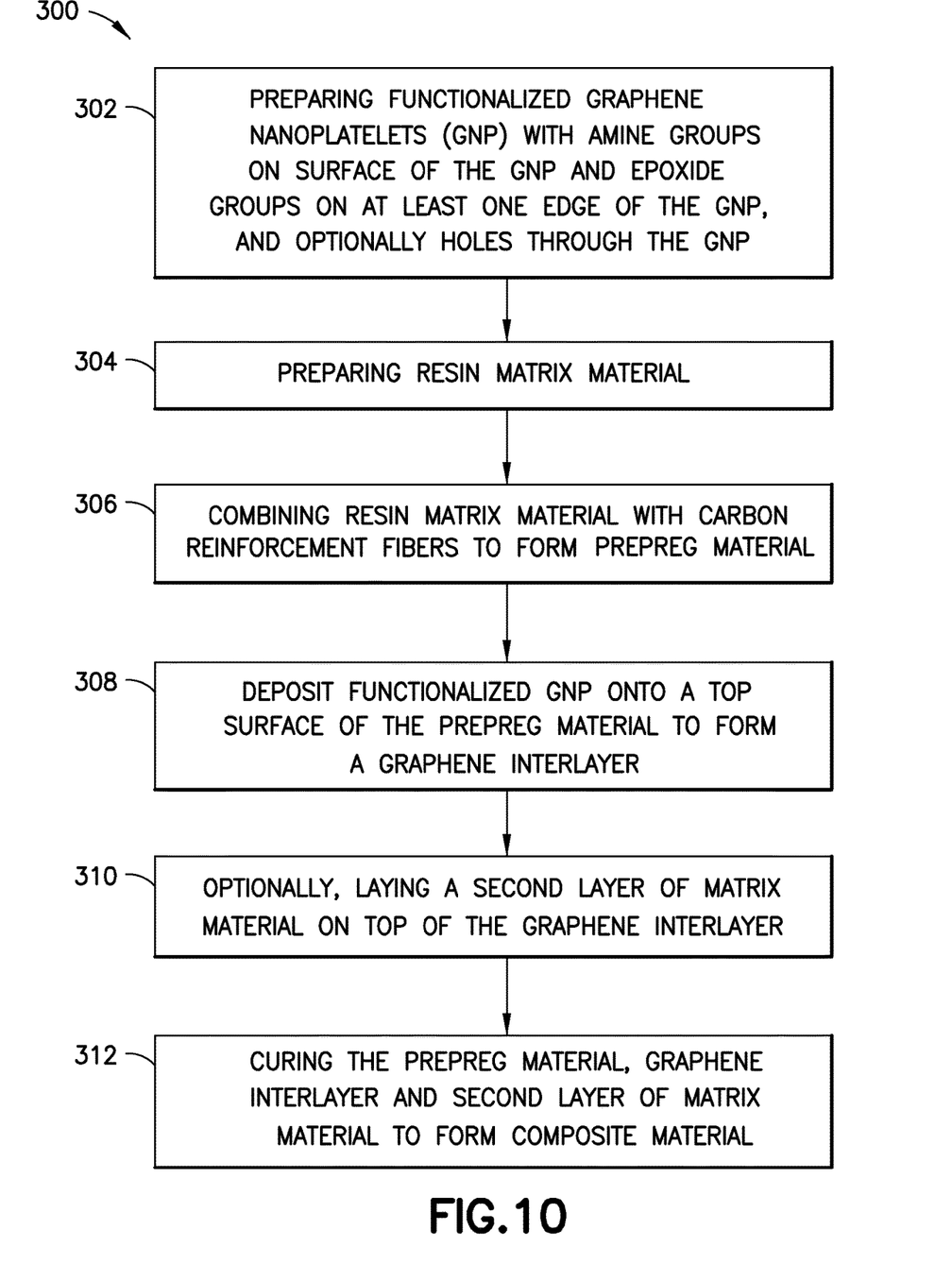
FIG. 10 is an illustration of a flow diagram of another exemplary method for increasing the strength, modulus and stiffness of a composite material.

FIG. 10 is an illustration of a flow diagram of another exemplary embodiment of a method 300 of increasing strength, modulus and stiffness of the composite material 28 shown in FIG. 2 comprising carbon reinforcement fibers 30 and a matrix material 32 comprising epoxy resin 33. The method 300 comprises step 302 of preparing functionalized GNP 34 (see FIGS. 6 and 7) having amine groups 38 formed on a surface 40 of the functionalized GNP 34 and epoxide groups 42 formed on at least one of the edges 36 of the functionalized GNP 34 in accordance with the disclosure above. The functionalized GNP 34 should be roughly rectangular in shape with edges 36 having a length on the order of about 100-5,000 nanometers (0.1-5 microns). Optionally, the functionalized GNP 34 may be provided with holes 44 formed through the functionalized GNP 34 as disclosed above.

In step 304, a matrix material 32 is prepared to be an aerospace-grade resin 33. The matrix material 32 may be prepared having the qualities of an aerospace-grade resin, or purchased from a supplier of aerospace-grade resins. The matrix material 32 in this embodiment does not include any functionalized GNP 34.

Figure 11:
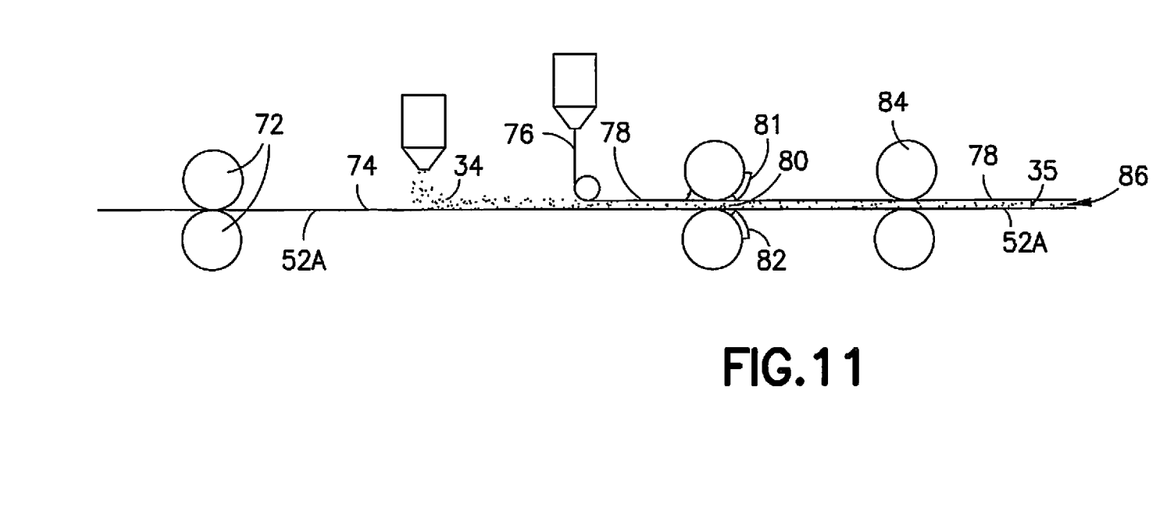
FIG. 11 is an illustration of an exemplary manufacturing process line that may be used in the method shown in FIG. 10.

The method 300 further comprises the step 306 of combining the matrix material 32 with a plurality of carbon reinforcement fibers 30 using equipment and processes known in the art to form a composite prepreg material 52A. For example, the equipment illustrated in FIG. 9 may be used by applying a matrix material 32 (without any functionalized GNP 34) from the application device 48 to form the composite prepreg material 52A. In FIG. 11, the prepreg material 52A is shown exiting the nip rollers 72 shown in FIG. 9.

In step 308, referring to the exemplary processing equipment in FIG. 11, functionalized GNP 34 is deposited onto a top surface 74 of the prepreg material 52A to form a graphene interlayer 35 (see FIG. 4) by any known aerial application method for depositing solid flakes, powders, or liquids, such as dusting, dispersion by sonication in a low vapor-pressure solvent, or pouring or spraying at such a mass rate that after the solvent evaporates, the remaining functionalized GNP 34 covers the desired area on the top surface 74 of the prepreg material 52A. The graphene interlayer 35 preferably covers up to about 30% of the area of the top surface 74 of the prepreg material 52.

In step 310, an optional second layer 76 of matrix material 32 may be laid on top of the graphene interlayer 35 to form a film 78 to bind the functionalized GNP 34. The second layer 76 of matrix material 32 may or may not include any functionalized GNP 34. The second layer 76 of matrix material 32 is preferably fabricated as a film on a second backing paper that goes through its own spreader bar that determines its thickness. Then, the second layer 76 is laid onto the graphene interlayer 35 such that the film is positioned adjacent the graphene interlayer 35 and the second backing paper is exposed. The prepreg material 52A, the graphene interlayer 35 and the second layer 76 of matrix material 32 are fed through a second nip 80 between a second spreader bar 81 and a second backing bar 82, and then toward a pair of heated nip rollers 84 to consolidate the final prepreg 86. The second backing paper in the second layer 76 should then be removed. In step 312, the final prepreg 86 is cured to form the composite material 28B (see FIG. 4) using equipment and processes known in the art. If the second layer 76 of matrix material 32 includes functionalized GNP 34, then shear could be applied in the mixer that mixes the functionalized GNP 34 with the matrix material 32.

Figure 12:
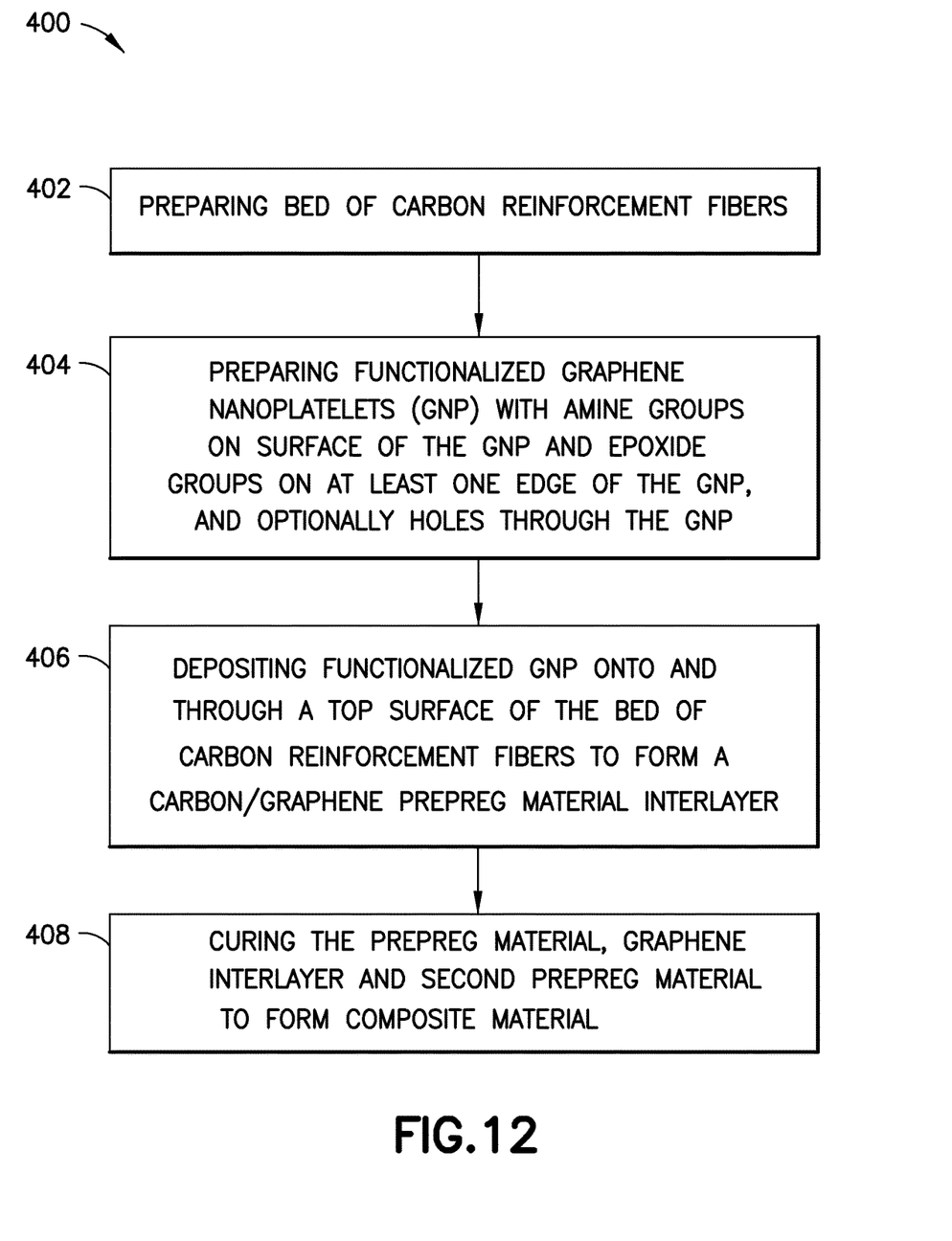
FIG. 12 is an illustration of a flow diagram of yet another exemplary method for increasing the strength, modulus and stiffness of a composite material.
Figure 13:
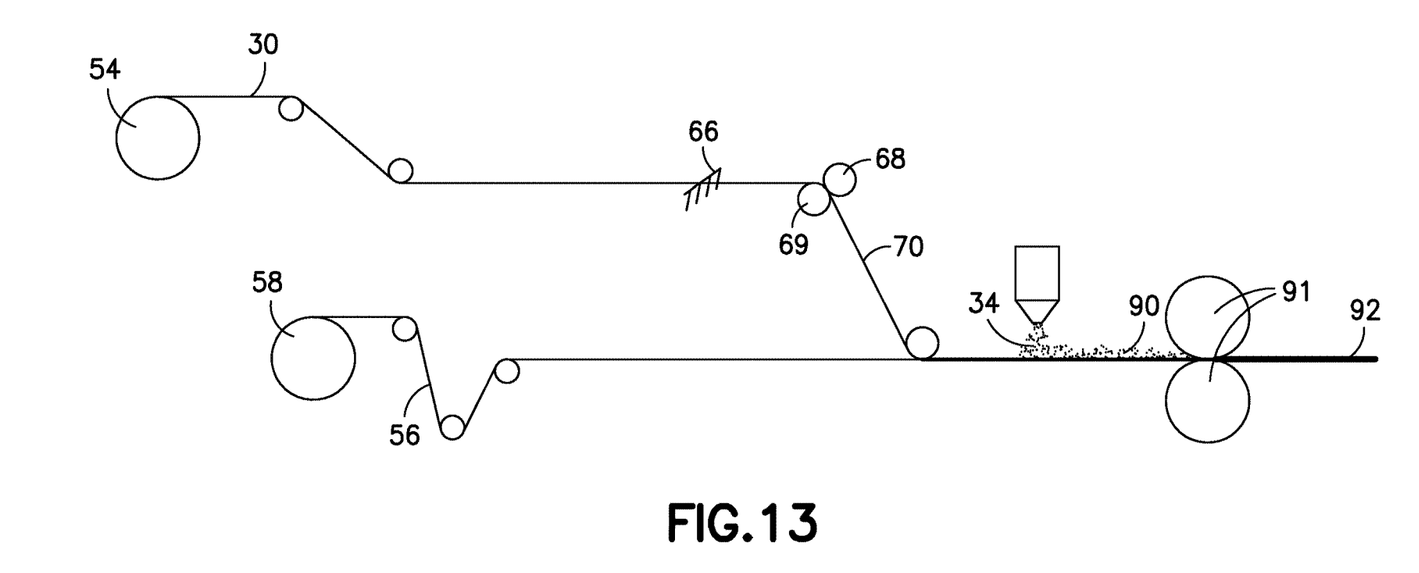
FIG. 13 is an illustration of an exemplary manufacturing process line that may be used in the method shown in FIG. 12

Applying this method results in a carbon fiber reinforced polymer laminate with nanocomposite interlayer toughener. The toughening interlayer 35 is a macromolecule comprised of the base amine monomer (such as 44'DDS), base epoxy monomer (such as Bisphenyl F), and the functionalized GNP 34. The dendrimeric structure of the macromolecule in the interlayer 35 has been replaced with a more complicated structure that may contain loops interpenetrating other similar macromolecules. If the functionalized GNP 34 has holes 44, then the complicated structure may also contain linkages that penetrate the holes 44, either within the same macromolecule or in other similar macromolecules FIG. 12 is an illustration of a flow diagram of yet another embodiment of a method 400 of increasing strength, modulus and stiffness of the composite material 28 shown in FIG. 2 comprising carbon reinforcement fibers 30 and a matrix material 32. In this method, the matrix material 32 comprises 100% functionalized GNP 34 and no resin 33. The functionalized GNP 34 has edges 36 having a length on the order of 10-100 nanometers, smaller than the previous embodiments. In step 402, and referring to an exemplary process line shown in FIG. 13, a bed 70 of carbon reinforcement fibers 30 is formed on a backing paper 56. Similar to the equipment shown in FIG. 9, one or more creels 54 of carbon fiber 30 are fed through a spreading comb 66 and through a second set of a spreader 68 and a backing bar 69 to produce a bed 70 of aligned carbon fibers 30 on top of the backing paper 56. In step 404, functionalized GNP 34 is prepared as disclosed above, but of a smaller size. In step 406, functionalized GNP 34 is deposited onto and through a top surface 90 of the bed 70 of carbon reinforcement fibers 30 to penetrate the entire bed 70 of fibers. The carbon reinforcement fibers 30 with the functionalized GNP 34 are then passed through a pair of nip rollers 91 to compress and form a carbon/graphene prepreg material 92. The functionalized GNP 34 is deposited to a controlled even density, such as 60 grams per square meter to 120 grams per square meter. In step 408, the carbon/graphene prepreg material is cured with equipment and processes known in the art to form the composite material 28C shown in FIG. 5. The functionalized GNP 34 in this method 400 creates a macromolecule through epoxy-amine reaction.

Many other modifications and variations may of course be devised given the above description of various embodiments for implementing the principles in the present disclosure. For example, and without limitation, the same technology may be applied to fabric forms of prepreg materials where the carbon fibers are not aligned. It is intended that all such modifications and variations be considered as within the spirit and scope of this disclosure, as defined in the following claims.

The invention claimed is:

1. A composite material comprising carbon reinforcement fibers and a matrix material, the matrix material comprising:
   an aerospace-grade epoxy resin having epoxy molecules that are at least tri-functional and a first ratio of epoxide groups to amine groups; and
   0.1% to 5.0% by weight functionalized graphene nanoplatelets dispersed throughout the aerospace-grade epoxy resin, the graphene nanoplatelets having amine groups bound to a surface of the graphene nanoplatelets, epoxide groups formed on at least one edge of the graphene nanoplatelets, and holes formed through the graphene nanoplatelets, such that the first ratio of epoxide groups to amine groups in the aerospace-grade epoxy resin is the same as a second ratio of epoxide groups to amine groups in the matrix material.

2. The composite material of claim 1, wherein the holes are substantially circular and have a diameter of 1-2 nanometers.

3. The composite material of claim 1, wherein about 12-80 carbon atoms are removed from the graphene nanoplatelets to form each of the holes.

4. The composite material of claim 1, wherein the amine groups on the surface of the graphene nanoplatelets have a surface density of about 4.0E10 to about 2.0E12 groups per square millimeter.

5. The composite material of claim 4, wherein the graphene nanoplatelets have a linear density of epoxide groups formed on the edge of about 7,000 to about 700,000 groups per millimeter.

6. The composite material of claim 1, wherein about 0.1% to about 5.0% of carbon atoms in the graphene nanoplatelets have amine groups bonded thereto.

7. The composite material of claim 6, wherein about 0.1% to about 10% of carbon atoms at the edge of the graphene nanoplatelets have epoxide groups bonded thereto.

8. The composite material of claim 1, wherein the epoxy resin is a macromolecule comprised of a base amine monomer, a base epoxy monomer and the graphene nanoplatelets.

9. The composite material of claim 1, wherein molecules in the matrix material penetrate through the holes formed through the graphene nanoplatelets such that the molecules are mechanically constrained by the graphene nanoplatelets.

10. An aircraft comprising composite structures made from the composite material of claim 1.

11. A composite material comprising carbon reinforcement fibers and a matrix material, the matrix material comprising:
   two layers of an aerospace-grade epoxy resin having epoxy molecules that are at least tri-functional and a first ratio of epoxide groups to amine groups; and
   0.1% to 5.0% by weight functionalized graphene nanoplatelets having amine groups bound to a surface of the graphene nanoplatelets, epoxide groups formed on at least one edge of the graphene nanoplatelets, and holes formed through the graphene nanoplatelets, the graphene nanoplatelets forming an interlayer between the two layers of the epoxy resin such that the first ratio of epoxide groups to amine groups in the aerospace-grade epoxy resin is the same as a second ratio of epoxide groups to amine groups in the matrix material, and the interlayer is a macromolecule comprised of a base amine monomer, a base epoxy monomer and the graphene nanoplatelets.

* * * * *